(12) United States Patent
Li et al.

(10) Patent No.: US 11,976,885 B2
(45) Date of Patent: May 7, 2024

(54) PHASE CHANGE THERMAL MANAGEMENT DEVICE

(71) Applicant: INDUSTRIAL TECHNOLOGY RESEARCH INSTITUTE, Hsinchu (TW)

(72) Inventors: Yi-Tseng Li, New Taipei (TW); Yion-Ni Liu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/565,214

(22) Filed: Dec. 29, 2021

(65) Prior Publication Data

US 2023/0204303 A1 Jun. 29, 2023

(51) Int. Cl.
*F28D 20/02* (2006.01)
*F28D 20/00* (2006.01)

(52) U.S. Cl.
CPC .... *F28D 20/021* (2013.01); *F28D 2020/0086* (2013.01)

(58) Field of Classification Search
CPC ............ F28D 20/02; F28D 20/021; F28D 2020/0086; F28D 20/023; F28D 20/026; F28D 15/00; F28D 2021/0029; F28D 20/025; F28F 3/12
See application file for complete search history.

(56) References Cited

U.S. PATENT DOCUMENTS

| | | | |
|---|---|---|---|
| 6,220,337 B1 * | 4/2001 | Chen | F28D 15/0266 165/10 |
| 9,909,816 B2 | 3/2018 | Thiagarajan et al. | |
| 10,259,064 B2 | 4/2019 | Bugby et al. | |
| 10,615,471 B2 | 4/2020 | Xiang | |
| 2019/0375939 A1 | 12/2019 | Wei et al. | |
| 2020/0258811 A1 | 8/2020 | Joshi | |

FOREIGN PATENT DOCUMENTS

| | | | | |
|---|---|---|---|---|
| CN | 201594969 U | * | 9/2010 | |
| CN | 102592883 A | | 7/2012 | |
| CN | 206073779 B | | 4/2017 | |
| CN | 108251063 A | | 7/2018 | |
| CN | 208433401 U | * | 1/2019 | ............ G06F 1/206 |
| CN | 110065646 A | * | 7/2019 | |

(Continued)

OTHER PUBLICATIONS

Shamberger et al., "Review of metallic phase change materials for high heat flux transient thermal management applications" Applied Energy, Mar. 18, 2019.
(Continued)

*Primary Examiner* — Harry E Arant
(74) *Attorney, Agent, or Firm* — Maschoff Brennan

(57) ABSTRACT

A phase change thermal management device includes a casing, a plurality of inner walls and a phase change material. The casing defines an internal space. The inner walls are arranged in the internal space and crossed one another to form a plurality of accommodation cells. Two adjacent accommodation cells are communicated with each other through at least one opening on one of the inner walls. The phase change material is provided in at least portions of the accommodation cells.

17 Claims, 9 Drawing Sheets

(56) References Cited

FOREIGN PATENT DOCUMENTS

| CN | 110218095 | A | | 9/2019 | | |
|---|---|---|---|---|---|---|
| CN | 112480876 | A | | 3/2021 | | |
| CN | 113074570 | A | | 7/2021 | | |
| DE | 2530064 | A1 | * | 1/1977 | | |
| DE | 19953113 | C1 | * | 12/2000 | ............ | C09K 5/063 |
| DE | 102012100820 | A1 | * | 8/2013 | ........... | F28D 20/021 |
| TW | 549793 | U | | 8/2003 | | |
| TW | I422792 | B | | 1/2014 | | |
| TW | 202000850 | A | | 1/2020 | | |
| TW | I709207 | B | | 11/2020 | | |
| TW | 202122732 | A | | 6/2021 | | |

OTHER PUBLICATIONS

Guo et al., "Thermal performance of a 3D printed lattice-structure heat sink packaging phase change material" Chinese Journal of Aeronautics, Aug. 20, 2020.

TW Office Action in Application No. 110149289 Dated Aug. 31, 2022.

* cited by examiner

PHASE CHANGE THERMAL MANAGEMENT DEVICE

BACKGROUND

1. Technical Field

This present disclosure relates to phase change thermal management.

2. Related Art

The heat dissipation of electronic products has been a problem in this field for a long time. In general, cooling fans and water cooling systems are considered to be efficient for thermal dissipation. However, netcom equipment, satellite kits and rechargeable batteries are usually utilized in outdoor or outer space, and therefore fans or water cooling systems do not work due to lack of power supply in these environments. In such a case, the heat dissipation mainly relies on passive heat dissipation ways such as natural convection and radiation.

SUMMARY

According to one embodiment of the present disclosure, a phase change thermal management device includes a casing, a plurality of inner walls and a phase change material. The casing defines an internal space. The inner walls are arranged in the internal space and connected with one another to form a plurality of accommodation cells. Two adjacent accommodation cells are communicated with each other through at least one opening on the inner walls. The phase change material is provided in at least portions of the accommodation cells.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
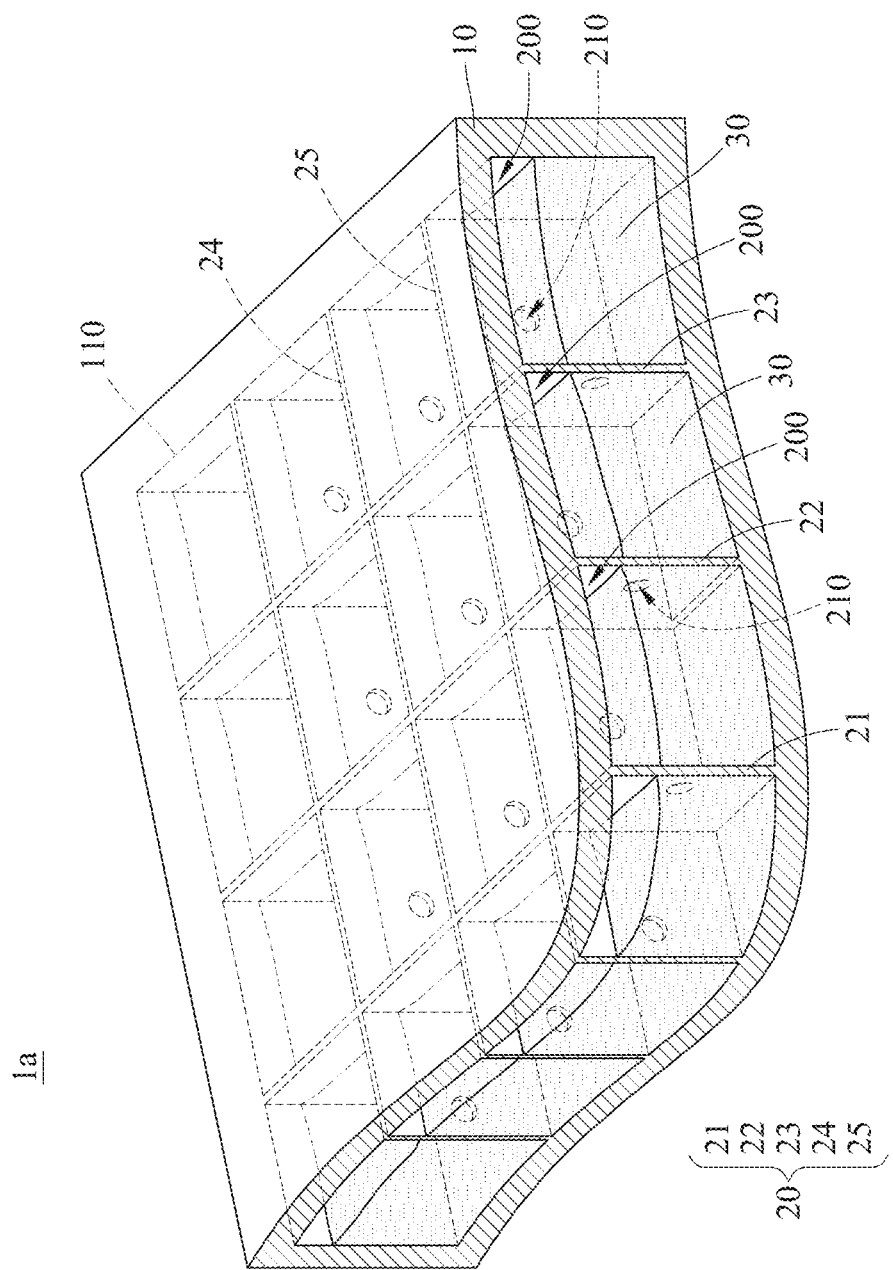
FIG. 1 is a perspective view of a phase change thermal management device according to one embodiment of the present disclosure.
Figure 2:
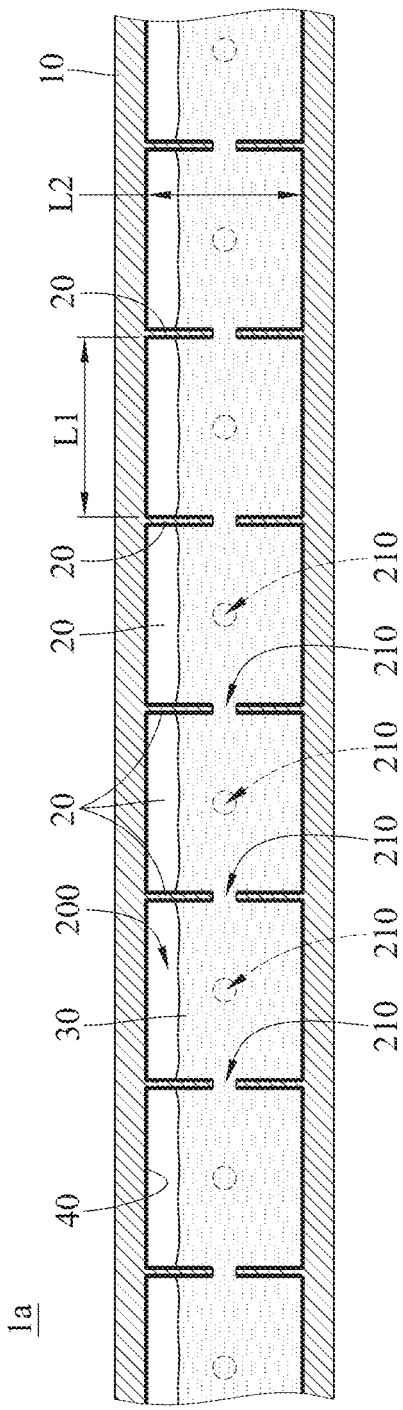
FIG. 2 is a cross sectional view of the phase change thermal management device in FIG. 1.

Please refer to FIG. 1 and FIG. 2. FIG. 1 is a perspective view of a phase change thermal management device according to one embodiment of the present disclosure, and FIG. 2 is a cross sectional view of the phase change thermal management device in FIG. 1. In this embodiment, a phase change thermal management device 1a may include a casing 10, a plurality of inner walls 20, and a phase change material 30.

The casing 10, for example but not limited to, is a metal casing defining an internal space 110. The plurality of inner walls 20 may be arranged in the internal space 110 of the casing 10, and the inner walls 20 may be connected with one another to form a plurality of accommodation cells 200. More specifically, ends of the inner walls 20 may be connected with an inner surface of the casing 10, and such connection can be implemented in integrally formed or non-integrally formed wherein the non-integrally formed may be: buckling or hooking of separated elements, but the present disclosure is not limited thereto. As shown in FIG. 1, the inner walls 20 may cross one another to form a frame with mesh structure. FIG. 1 and FIG. 2 show multiple inner walls 20 crossing one another to form a plurality of square accommodation cells 200, while the present disclosure is not limited by the shape of accommodation chamber 200. The inner walls 20 may be made of metal, plastic, polymer or a combination thereof.

Among the accommodation cells 200, the inner wall 20 may be provided between each pair of adjacent accommodation cells 200, and said pair of adjacent accommodation cells 200 may be communicated with each other through an opening 210 on the inner wall 20. More specifically, the inner walls 20 may include a first inner wall 21, a second inner wall 22, a third inner wall 23, a fourth inner wall 24 and a fifth inner wall 25, wherein the first inner wall 21, the second inner wall 22 and the third inner wall 23 may be arranged to be parallel to one another. The fourth inner wall 24 and the fifth inner wall 25 may be arranged to be parallel to each other. Each of the fourth inner wall 24 and the fifth inner wall 25 may cross the first inner wall 21, the second inner wall 22 and the third inner wall 23 to from the accommodation cells 200, and a pair of adjacent accommodation cells 200 may be communicated with each other through the opening 210 on the second inner wall 22. Similarly, any pair of adjacent accommodation cells 200 may be communicated with each other through the opening 210 on the first inner wall 21, the third inner wall 23, the fourth inner wall 24 or the fifth inner wall 25. As to three accommodation cells 200 which are arranged side by side, the centerlines of the openings 210 on the inner walls 20 may be coaxial or non-coaxial. Moreover, the openings may have the same size, or have difference sizes in order to enhance turbulence of fluid to facilitate heat transfer. FIG. 1 and FIG. 2 show that each inner wall 20 between adjacent accommodation cells 200 includes single opening 210, while the present disclosure is not limited by the number of opening 210.

The phase change material 30 may be located in at least portions of the accommodation cells 200. FIG. 1 and FIG. 2 show that the phase change material 30 is provided in each accommodation chamber 200, while some accommodation cells may lack phase change material in some other embodiments.

The phase change material 30 may be a solid-to-liquid phase change material or liquid-to-gas phase change material. The solid-to-liquid phase change material may include In—Bi—Sn alloy, In—Ga—Sn alloy, paraffin or a combination thereof. Besides, graphite or metal foam (not shown in the drawings) may be added in the phase change material 30 to improve heat conduction ability of the phase change material 30. The metal foam may include at least one of aluminum foam, copper foam and nickel foam.

When heat generated by an external heat source (e.g., a high power chip of a network equipment, not shown) is transferred to the phase change thermal management device 1a, the amount of heat may pass through the casing 10 and the inner walls 20 sequentially to thereby reach the phase change material 30, and the phase change material 30 can absorb heat energy by its heat capacity and latent heat during phase transition to control the temperature of the external heat source. In one embodiment using a solid-to-liquid phase change material, after phase transition, the transformed phase change material 30 is in a liquid state, such that the liquid phase change material 30 in any one of the accommodation cells 200 can flow into adjacent accommodation cells 200 through the openings 210 on the inner walls 20. If the phase change material 30 in other accommodation cells 200 is still in a solid state, the liquid phase change material 30 can cause the solid phase change material 30 to undergo phase transformation to thereby perform its function of absorbing heat. Furthermore, in a case that the temperature of some accommodation cells 200 at specific region is overly high due to heat accumulation or concentrated heat sources, the liquid phase change material 30 can flow into the accommodation chamber 200 with high temperature through the opening 210 to be widely distributed in the high temperature accommodation cells 200, thereby improving heat dissipation efficiency.

In this embodiment, phase change thermal management device 1a may include a surface treatment coating 40 formed on the surfaces of each inner wall 20. The surface treatment coating 40 may be made of cobalt, nickel, molybdenum, titanium or a combination thereof. FIG. 1 and FIG. 2 show that the surface treatment coating 40 spreads over overall area on a surface of the inner wall 20, but the present disclosure is not limited thereto. In some embodiments, the surface treatment coating 40 may be only provided around the opening; that is, the surface treatment coating 40 may be merely cover the periphery of the opening 210. The surface treatment coating 40 is helpful to enhance wetting (or referred to hydrophilicity) of the inner walls 20, such that the liquid phase change material 30 can flow among the accommodation cells 200 through the openings 210 more easily and enhance the heat transfer rate between phase change material 30 and inner wall 20.

In this embodiment, the opening 210 may be filled with the phase change material 30. More specifically, in this embodiment using solid-to-liquid phase change material, the position of each opening 210 on the inner wall 20 is suitable for the opening 210 to be filled with the phase change material 30 in a liquid state. For example, a paraffin, taken as the phase change material 30, the opening 210 of the inner wall 20 is fully filled with solid paraffin and liquid paraffin as shown in FIG. 2; or, at least portions of the opening 210 which is not covered by solid paraffin exposed to outside, and the opening 210 is fully filled with by liquid paraffin when the paraffin turns to liquid and expands in volume. A proper position of the opening 210 is helpful to the natural convection of liquid phase change material 30.

In this embodiment, the inner wall 20 between a pair of adjacent accommodation cells 200 may have an aperture ratio of 10% to 20%. As shown in FIG. 2, the inner wall 20 between two adjacent accommodation cells 200 may have an area of A1, an area of the opening 210 on the inner wall 20 may have an area of A2, and the aperture ratio can be defined as: A2/A1. The aperture ratio may satisfy the following condition: $10\% \leq A2/A1 \leq 20\%$. The opening 210 with proper aperture ratio is helpful to enhance the natural convection effect of liquid phase change material 30 between adjacent accommodation cells 200. In FIG. 2, the area (A1) of the inner wall 20 is defined as the product of width (L1) and height (L2) of the inner wall 20.

Figure 3:
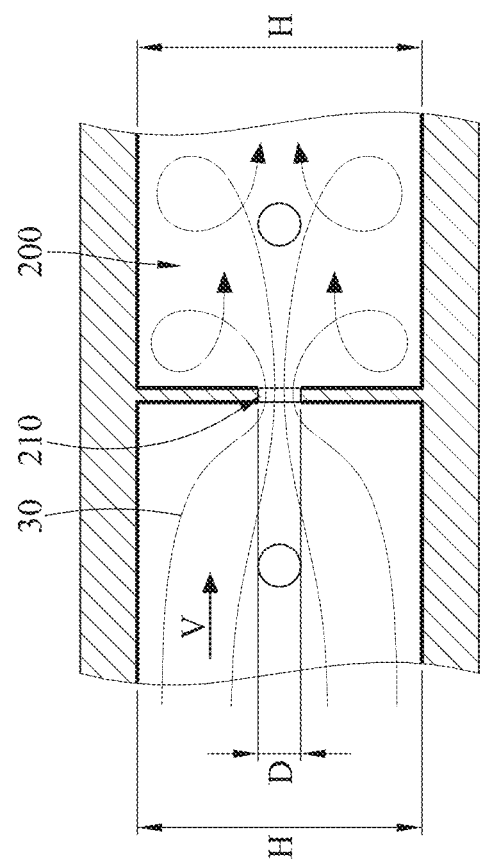
FIG. 3 a partially enlarged view of the phase change thermal management device in FIG. 2.

Please refer to FIG. 3 showing a partially enlarged view of the phase change thermal management device in FIG. 2. In this embodiment using solid-to-liquid phase change material, a diameter of the opening 210 may be determined according to the natural convection flow velocity of the phase change material 30 at liquid state, the viscosity of the phase change material 30 at liquid state and/or the radial size of the accommodation cells 200 communicated with the opening 210. The natural convection flow velocity of liquid phase change material 30 can be defined as the velocity of the phase change material 30 before it flows through the opening 210, and the phase change material 30 can be regarded as laminar flow at this point. As shown in FIG. 3, the opening may have a diameter of D, the liquid phase change material may have a natural convection flow velocity of V, the liquid phase change material may have a viscosity of v, the accommodation chamber 200 may have a radial size of H, and the following condition can be satisfied: $D \leq (VH^2)/2200v$. A proper diameter of the opening 210 can make the laminar phase change material flow in any accommodation cell 200 enter into another accommodation cell 200 through the opening 210 to be turbulent flow, and thereby improving thermal dissipation efficiency. In FIG. 3, the radial size H of the accommodation chamber 200 communicated with the opening 210 may be equal to the height L2 of the inner wall 20.

Also, in some embodiments using liquid-to-gas phase change material, the diameter of the opening 210 may be determined according to the natural convection flow velocity of the phase change material 30 at gaseous state, the viscosity of the phase change material 30 at gaseous state and/or the radial size of the accommodation chamber 200 communicated with the opening 210.

Figure 4:
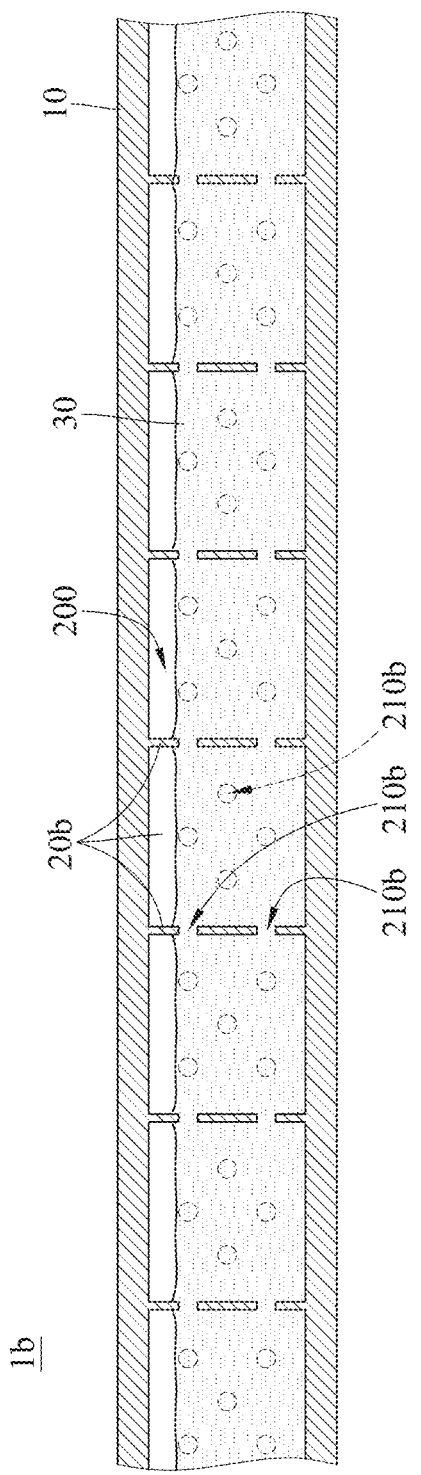
FIG. 4 is cross sectional view of a phase change thermal management device according to another embodiment of the present disclosure.

FIG. 4 is cross sectional view of a phase change thermal management device according to another embodiment of the present disclosure. In this embodiment, a phase change thermal management device 1b may include a casing 10, a plurality of inner walls 20b and a phase change material 30. Each inner wall 20b between a pair of adjacent accommodation cells 200 may include a plurality of openings 210b. The openings 210b may have the same shapes and sizes, or different shapes or sizes. The arrangement of openings 210b on one inner wall 20b may be the same as or different from that one another inner wall 20b. The inner wall 20b between a pair of adjacent accommodation cells 200 may have an aperture ratio of 10% to 20%. In detail, the inner wall 20b may have an area of A1, all openings 210b on the inner wall 20b have a total area of A2, and the aperture ratio can be defined as: A2/A1. The aperture ratio may satisfy the following condition: 10%≤A2/A1≤20%.

Figure 5:
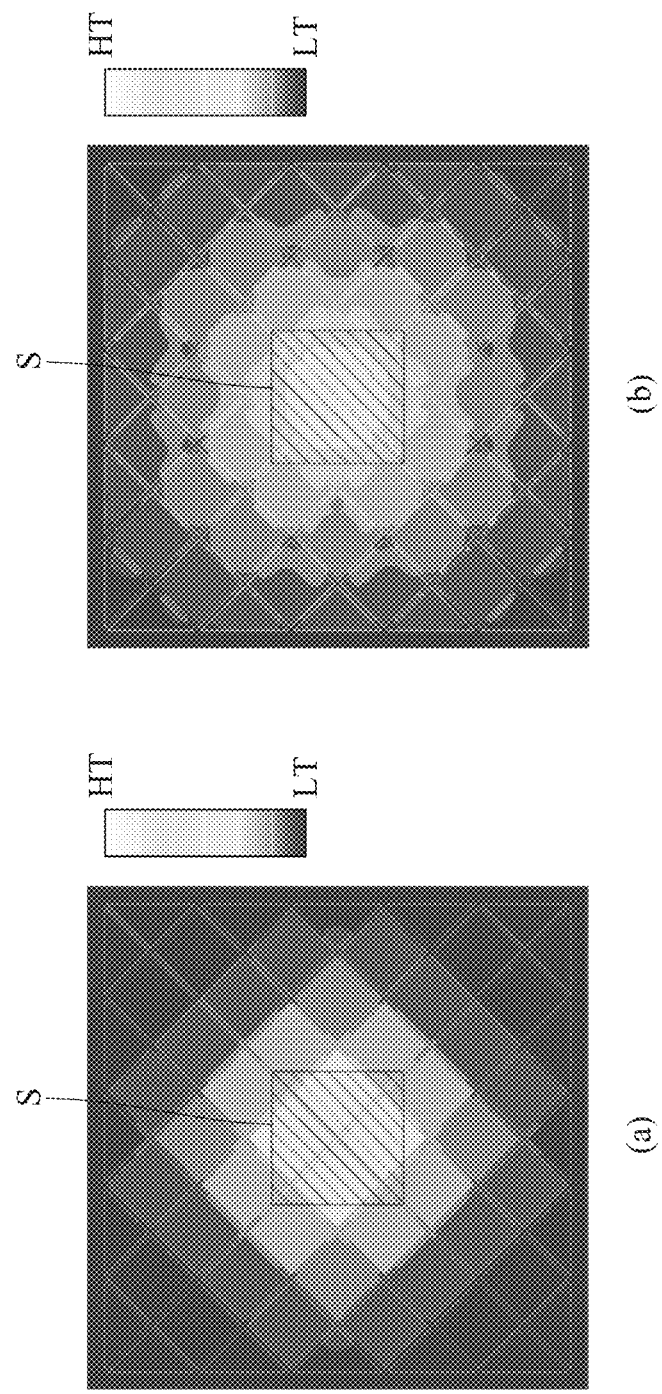
FIG. 5 shows graph models respectively representing temperature distribution of a conventional phase change thermal management device and the phase change thermal management device according to one embodiment of the present disclosure.

FIG. 5 shows graph models respectively representing temperature distribution of a conventional phase change thermal management device according to nay embodiment of the present disclosure. The conventional phase change thermal management used for modeling herein may include a sealed casing and multiple inner walls in the sealed casing, and the inner walls may be connected with one another to from multiple sealed accommodation cells; that is, there is no opening or opening formed on the inner walls of the conventional phase change thermal management. FIG. 5(a) shows a temperature distribution of the conventional phase change thermal management where a heat source S is applied and works for 1 hour, and FIG. 5(b) shows a temperature distribution of the phase change thermal management device 1a in FIG. 1 where the same heat source S is applied and works for 1 hour. As to the conventional phase change thermal management device in FIG. 5(a), it is observed that a central region nearby the heat source S has significantly high temperature (HT), and a peripheral region away from the heat source S has relatively low temperature (LT), which indicates that most amount of heat is accumulated at the central region and fail to be transferred to the peripheral region efficiently. On the contrary, as to the phase change thermal management device 1a in FIG. 5(b), it is observed that although a central region nearby the heat source S still has high temperature and a peripheral region away from the heat source S still has low temperature, a temperature difference between the central region and the peripheral region is relatively small, and the peripheral region in FIG. 5(b) includes a larger low temperature area than that in FIG. 5(a), which indicates that the openings facilitate free flow of the phase change material such that heat can be transferred to the peripheral region more quickly.

Figure 6:
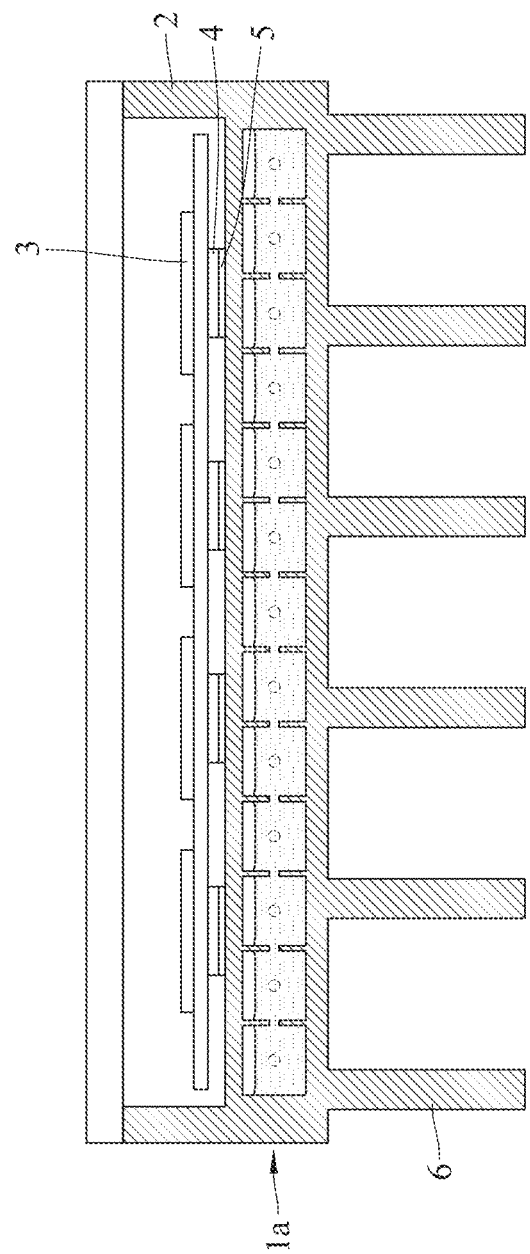
FIG. 6 is a schematic view of an electronic product equipped with the phase change thermal management device according to still another embodiment of the present disclosure.

FIG. 6 is a schematic view of an electronic product equipped with the phase change thermal management device according to still another embodiment of the present disclosure. An electronic product may be a communication equipment including a base 2, an antenna 3, an amplifier 4, a thermal interface 5, a heat sink 6, and the phase change thermal management device 1a in FIG. 1. The antenna 3, the amplifier 4 and the thermal interface 5 may be disposed at one side of the base 2, and the phase change thermal management device 1a and the heat sink 6 are disposed at opposite side of the base 2. The antenna 3 and the amplifier 4 can be regarded as heat sources. Heat generated by the antenna 3 and the amplifier 4 may be transferred to the phase change thermal management device 1a through the thermal interface 5. The phase change material accommodated in the phase change thermal management device 1a absorb heat to prevent the antenna 3 and the amplifier 4 from overheating, and then heat is dissipated by the heat sink 6. The heat sink 6 may include fins or copper plate.

Figure 7:
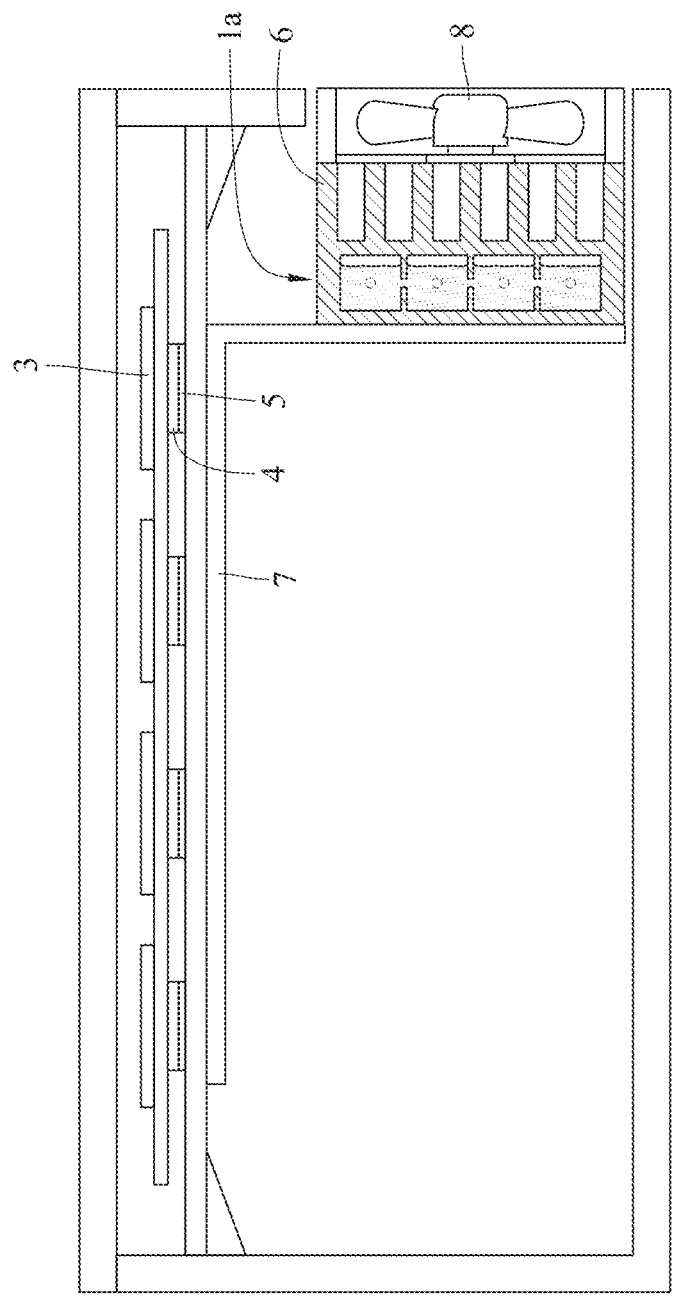
FIG. 7 is a schematic view of an electronic product equipped with the phase change thermal management device according to yet another embodiment of the present disclosure.

FIG. 7 is a schematic view of an electronic product equipped with the phase change thermal management device according to yet another embodiment of the present disclosure. In comparison with the electronic product in FIG. 6, an electronic product in FIG. 7 further includes a heat pipe 7 and a cooling fan 8. Heat generated by the antenna 3 and the amplifier 4 can be transferred to the phase change heat management device 1a through the thermal interface 5 and the heat pipe 7. Heat absorbed by the phase change material of the phase change thermal management device 1a is dissipated by the heat sink 6 and the cooling fan 8.

According to the present disclosure, additional grooves or protrusions may be set around the openings of the phase change thermal management device for uniform heat distribution. Please refer to FIG. 8 through FIG. 10, wherein each is a partial view of accommodation cells in a phase change thermal management device according to one embodiment of the present disclosure.

Figure 8:
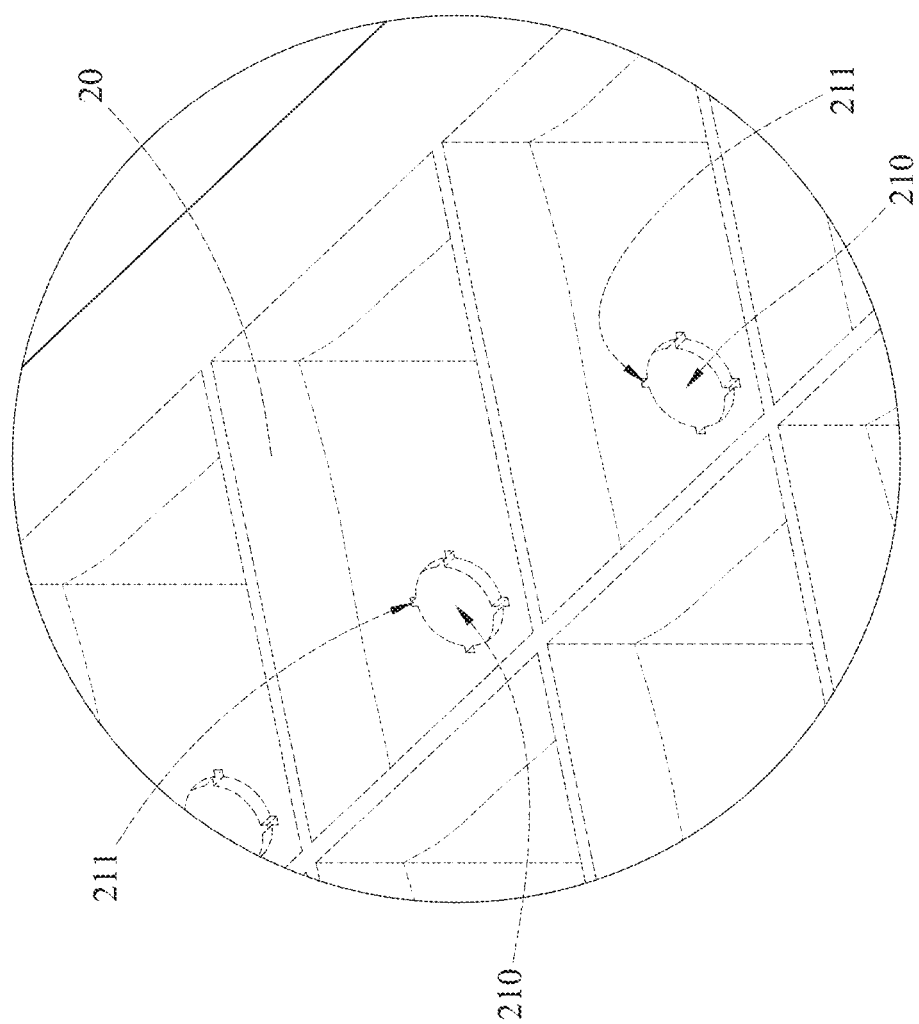
FIG. 8 is a partial view of accommodation cells in a phase change thermal management device according to one embodiment of the present disclosure.

In FIG. 8, a plurality of grooves 211 may be formed on the inner wall 20 and arranged around the opening 210. Two adjacent grooves 211 are separated by 90 degrees in a circumferential direction with respect to the center of the opening 210.

Figure 9:
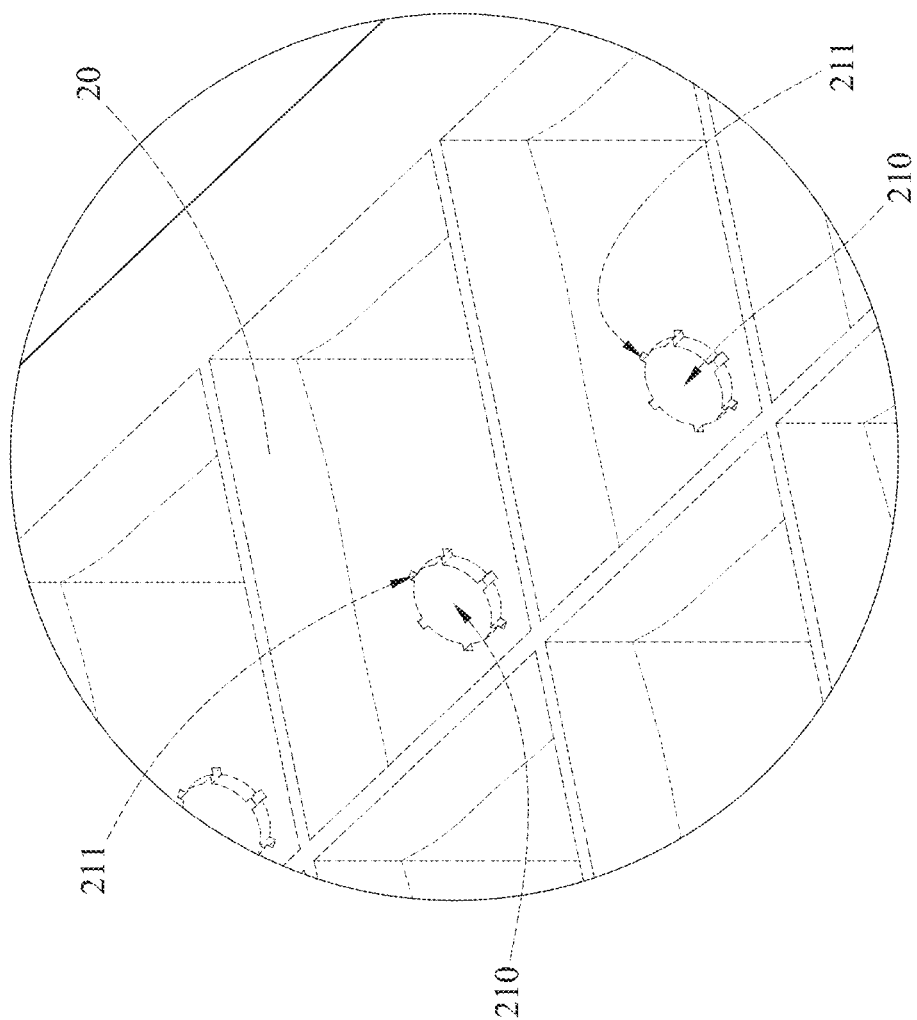
FIG. 9 is a partial view of accommodation cells in a phase change thermal management device according to one embodiment of the present disclosure.

In FIG. 9, a plurality of grooves 211 may be formed on the inner wall 20 and arranged around the opening 210. Two adjacent grooves 211 are separated by 60 degrees in a circumferential direction with respect to the center of the opening 210.

Figure 10:
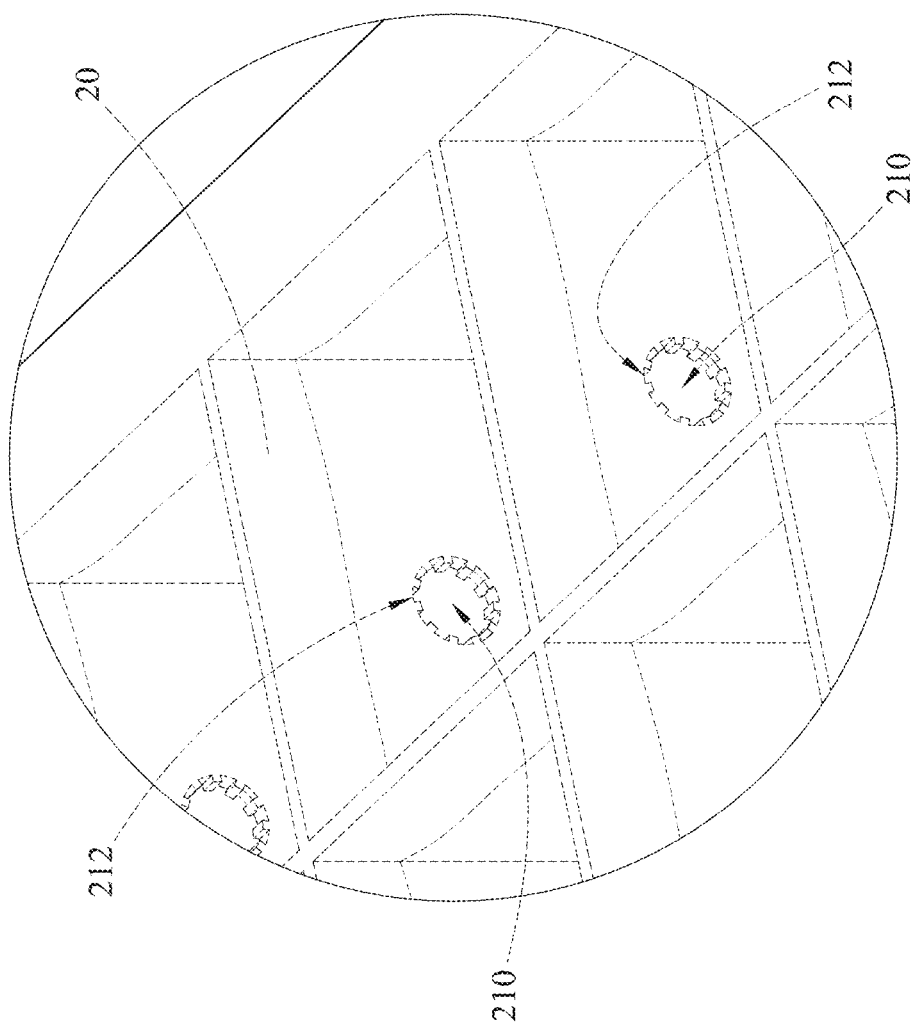
FIG. 10 is a partial view of accommodation cells in a phase change thermal management device according to one embodiment of the present disclosure.

In FIG. 10, a plurality of grooves 212 may be formed on the inner wall 20 and arranged around the opening 210. Each groove 212 may extend in radial direction of the opening 210 with a width of the groove 212 increasing gradually.

According to the present disclosure, the inner walls in the casing are connected with one another to form the accommodation cells for accommodating phase change material, and each pair of adjacent accommodation cells are communicated with each other through the opening of the inner wall. When heat generated by an external heat source is transferred to the phase change thermal management device, the phase change material can absorb heat to control the temperature of both the casing and the external heat source, and the liquid phase change material can flow into other accommodation cells through the openings. Therefore, if the phase change material in some accommodation cells does not experience phase change, the transformed phase change material can transfer heat by flows to make the phase change material in said some accommodation cells transform. Also, in a case that the temperature of some accommodation cells at specific region is overheated due to heat accumulation or concentrated heat sources, the liquid phase change material can flow into the accommodation chamber with high temperature through the opening to be widely distributed in the high temperature accommodation cells 200, thereby improving heat dissipation efficiency.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A phase change thermal management device, comprising:
    a casing defining an internal space;
    a plurality of inner walls arranged in the internal space, the plurality of inner walls connected with one another to form a plurality of accommodation cells, and adjacent two of the plurality of accommodation cells are communicated with each other through at least one opening on one of the plurality of inner walls; and
    a phase change material provided in at least portions of the plurality of accommodation cells, wherein the phase change material is a solid-to-liquid phase change material;
    wherein a plurality of grooves or a plurality of protrusions are arranged in a circumferential direction of the at least one opening and entirely disposed within the at least one opening, and located at an edge of the at least one opening.

2. The phase change thermal management device according to claim 1, wherein the phase change material comprises In—Bi—Sn alloy, In—Ga—Sn alloy, paraffin or a combination thereof.

3. The phase change thermal management device according to claim 1, further comprising a surface treatment coating provided on the plurality of inner walls.

4. The phase change thermal management device according to claim 3, wherein the surface treatment coating is made of cobalt, nickel, molybdenum, titanium or a combination thereof.

5. The phase change thermal management device according to claim 4, wherein the surface treatment coating is made of cobalt, nickel, molybdenum, titanium or a combination thereof.

6. The phase change thermal management device according to claim 1, further comprising a surface treatment coating provided around the at least one opening.

7. The phase change thermal management device according to claim 1, wherein the plurality of inner walls are made of metal, plastic, polymer or a combination thereof.

8. The phase change thermal management device according to claim 1, further comprising a metal foam provided in the phase change material.

9. The phase change thermal management device according to claim 8, wherein the metal foam comprises at least one of aluminum foam, copper foam and nickel foam.

10. The phase change thermal management device according to claim 1, wherein one of the plurality of inner walls between the adjacent two of the plurality of accommodation cells has an aperture ratio of 10% to 20%.

11. The phase change thermal management device according to claim 1, wherein the at least one opening is filled with the phase change material.

12. The phase change thermal management device according to claim 1, wherein a position of the at least one opening on one of plurality of inner walls is provided for the at least one opening to be filled with the phase change material at liquid state.

13. The phase change thermal management device according to claim 1, wherein a size the at least one opening is determined according to at least one of the following:
   a natural convection flow velocity of the phase change material at liquid state,
   a viscosity of the phase change material at liquid state, and
   a radial size of one of the plurality of accommodation cells communicated with the at least one opening.

14. The phase change thermal management device according to claim 13, wherein the size of the at least one opening is D, the natural convection flow velocity of the phase change material at liquid state is V, the viscosity of the phase change material at liquid state is v, the radial size of one of the plurality of accommodation cells communicated with the at least one opening is H, and the following condition is satisfied:

$D \leq (VH^2)/2200v.$

15. The phase change thermal management device according to claim 1, wherein the plurality of grooves or the plurality of protrusions extend in a radial direction of the at least one opening.

16. The phase change thermal management device according to claim 1, wherein each of the plurality of grooves or the plurality of protrusions has a thickness in an axial direction of the at least one opening and equal to a thickness of the corresponding inner wall.

17. The phase change thermal management device according to claim 1, wherein a side of each of the plurality of grooves or the plurality of protrusions is coplanar with a side surface of the corresponding inner wall.

* * * * *